6652X
R. WINANS.
Car Axle.
Patented July 20, 1831
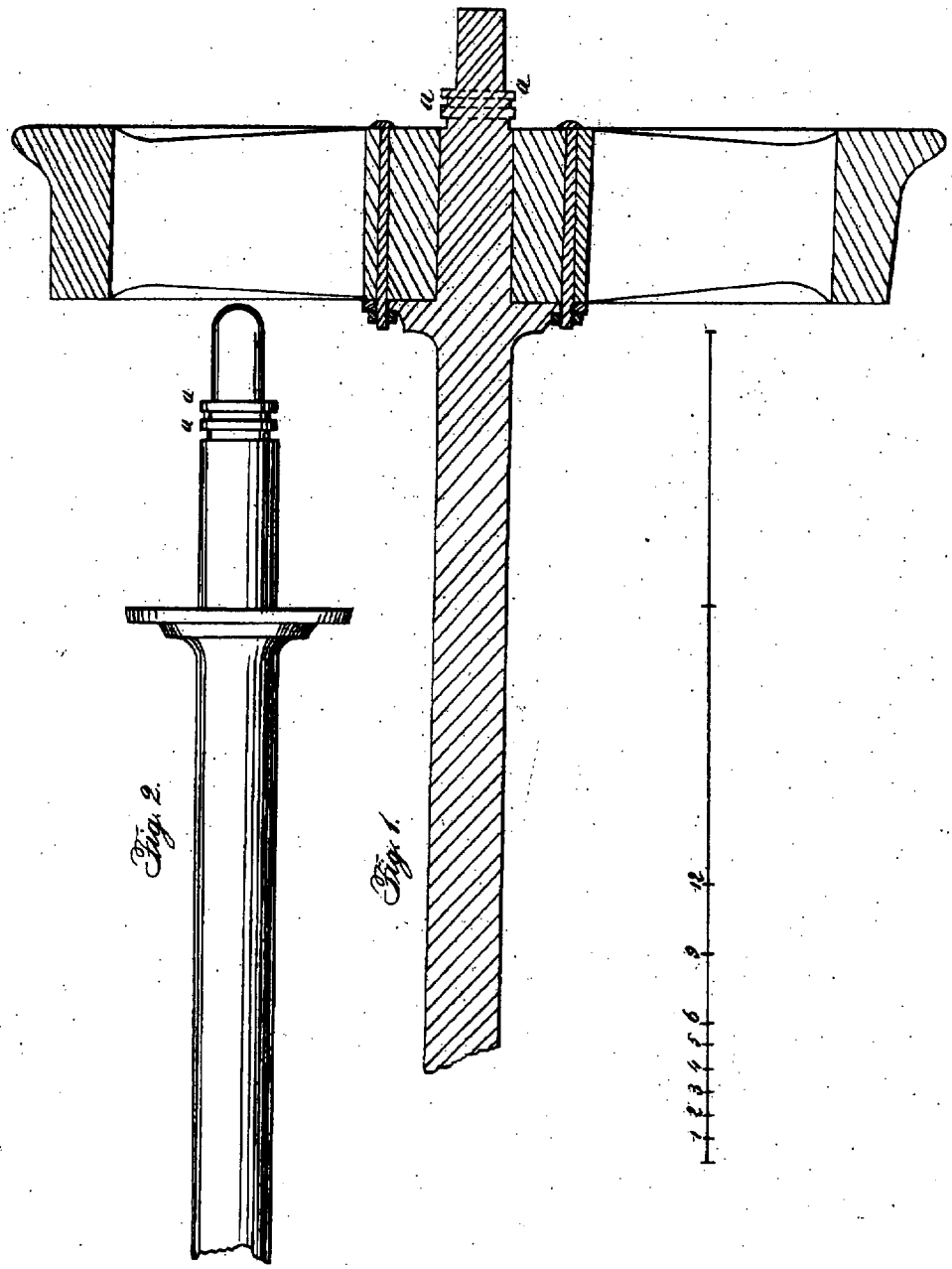
AM. PHOTO-LITHO. CO. N.Y. (SARGENT'S PROCESS.)

Roffe Vimeans [illegible]

Letters Patent

6652X

The Schedule referred to in these Letters Patent and making part of the same containing a description in [illegible] of the said Roffe Vimeans [illegible] Improvements in the construction of the axles of Railway and other wheeled Carriages To all whom it may concern. Be it known that I Roffe Vimeans have in vented an Improvement in the construction of the axles or bearings of Railway or other wheeled carriages and that the following is a full and exact description thereof. The axles with my improved journals or bearings may be made straight and the wheels placed thereon in the usual way but instead of forming the bearings [illegible] in the body of the Carriage and within the [illegible] or hubs of the wheels there to [illegible] the [illegible] of the load, by [illegible] the axles out at each end projecting beyond the [illegible] to such a length as shall enable me to form them into gudgeons. The length and di ameter of these gudgeons [illegible] according to the load they are intended to sus tain and other circumstances. In all cases however the value of my invention de pends upon the gudgeons having their diameter as small as a due attention to the strength required will allow. The reducing the axles to [illegible] bearings or upon bearings [illegible] admits of their being made much smaller than usual the degree of diminution which I have found to answer well in practice will [illegible] after be [illegible]. They should be formed of good wrought iron and [illegible] hardened or [illegible] or case with the best steel [illegible] hardened which [illegible] diminishes the [illegible] of bearing surface necessary to enable them to receive and resist the pressure of the load and their [illegible] they may therefore be short and [illegible] [illegible] very small diameter.
The [illegible] [illegible] [illegible] by forming the [illegible] [illegible] [illegible] by the [illegible] [illegible] [illegible]. By placing the [illegible] [illegible] of the wheels [illegible] [illegible]
[illegible]
[illegible]

of these by an enlargement of the wheels without affecting the [illegible]
the bearing journals. By the foregoing means the leverage of the wheels (or the
mechanical advantage with which the moving power acts to overcome the
resistance to motion) is increased and consequently the friction or resistance to
motion on Rail Road carriages diminished to a greater extent than here-
tofore. This improvement in the axles & journals of railway carriages was
devised and carried into operation on my experimental railway exhibited
to various persons in the early part of the year 1827. And it was put into
practical operation (under my direction) on the Baltimore & Ohio and on
the Liverpool & Manchester Rail Roads in the early part of 1829 in con-
nexion with another improvement for another diminution of friction by
means of a revolving bearing or friction wheel for which other improvement
a patent was granted to me on the 11th of October 1828. I constructed for
use on the latter of the before mentioned roads a number of cars with axles and
journals or gudgeons of various descriptions and dimensions, the gudgeons
(immediate place of bearing for the load) varied from 1¼ to 2¼ inches in
diameter and from 1½ to 3 inches in length. Some of them were made of
wrought iron and case hardened and some of iron overlaid with steel
and hardened. The axles between the wheels were mostly of wrought iron
of from 2¼ to 3 inches in diameter. Several cars were however construct-
ed with hollow cylindrical cast iron axles secured to the wheels by flanch-
es on the ends of the axles & bolts the gudgeons being separate pieces firmly
fixed into the naves of the wheels (wood may also be used for the axles to keep
the wheels in their parallel relation to each other with [illegible] gudgeons
as apparatus to receive the bearings). The result of experience by the practical
use of these cars for the conveyance of loads from 3 to 4 tons [illegible]
circumstances is that (for the support of a given load) the gudgeons or bear-
ing for the load might in the manner herein specified be safely made of
from one third to one half less in diameter than [illegible]
[illegible]
[illegible]
[illegible]
[illegible]

[illegible] The proportions and
[illegible] and have been [illegible]
[illegible] by the [illegible] of the [illegible]
[illegible] proportions of the bearing partially
[illegible] The object of this [illegible] a practical demonstra-
tion of [illegible] application to
the different [illegible] carriages [illegible] locomotive engine [illegible]
and to the different bearing [illegible] to be performed for the different pur-
poses (further [illegible]) will be evident and easy to any person
acquainted with the building of railway carriages. But to render it still
more so the following general directions and proportions are given, which
I think will be found to be a near appropriation to what will be required
in practice. When it is intended to carry loads of from 2½ to 3½ tons and
to use wheels of from 3 ft. to 3 feet in diameter, the general diameter of the ax-
le may be from 2½ to 3 inches, projecting through [illegible] beyond the nave of
the wheels [illegible] enough to go under and conveniently secure
the side frame of the [illegible] to have their ends turned or formed
into [illegible] about 2 ft. to 3 inches in length and from 1½ to 2 inches in
diameter. On the [illegible] the carriage body rests by
means of any hard metal bearing attached to the before mentioned side
pieces, which side pieces are so framed with the cross pieces of the body as to
go on the outside of the wheels either over or under the [illegible] as convenience
[illegible]. The friction occasioned by the tendency to a lateral
movement of the [illegible] is limited by causing the end [illegible] of the bearing to
[illegible] the centre of action as possible. When
[illegible] is intended to be used this end is attained by forming
[illegible] and when the [illegible] is used by forming
the [illegible] In consequence of the [illegible] of
[illegible] bearing on the journal, the bearing by
[illegible] of the most [illegible]
[illegible] of the [illegible]
[illegible]
[illegible]

[illegible]

between the [illegible] of the bearing of the [illegible]

[illegible] I do not intend to be understood as claiming [illegible]

with bearing [illegible] applied to the wheels, the employment of [illegible]

and of [illegible] rail way carriages (for [illegible] rail ways) [illegible]

And several kinds of rail way carriages have been [illegible] with four wheels each having separate axles with both inside and outside bearings with a view to turning curves with facility. A carriage was [illegible] Liverpool in England at a later date having [illegible] with outside bearings of the usual size for the purpose of using a [illegible] body temporarily, and without any view to the object of this improvement, nor affecting the like purpose. My invention is sufficiently distinguished from all other types known & used by the new & useful effect produced in the manner [illegible]

I therefore declare that the improvement or improvements above explained

[illegible] in diminishing the resistance to motion in wheel carriages to be used on rail ways, which I claim as my own invention, is the extending the axles each way outside of a pair or pairs of wheels far enough to form additional gudgeons to receive the bearing [illegible] of the [illegible] body and diminished as aforesaid with a view to lessen the resistance of friction, as well as its situation with the use of the most favorable metal for [illegible] will permit— thus conveniently in securing the [illegible] of the wheels without impairing their effective strength or durability.

Attestes
Thos. P. Jones
Jos. Anderson

Ross Winans

1052 [illegible]

(Patented [illegible] July 1831)

Ex.d
C.A.W.